US010207562B2

(12) United States Patent
Terashima

(10) Patent No.: US 10,207,562 B2
(45) Date of Patent: Feb. 19, 2019

(54) STABILIZER SUPPORT STRUCTURE

(71) Applicant: TOYOTA JIDOSHA KABUSHIKI KAISHA, Toyota-shi, Aichi-ken (JP)

(72) Inventor: Hirokazu Terashima, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 37 days.

(21) Appl. No.: 15/257,043

(22) Filed: Sep. 6, 2016

(65) Prior Publication Data

US 2017/0066301 A1 Mar. 9, 2017

(30) Foreign Application Priority Data

Sep. 9, 2015 (JP) ................................ 2015-177894

(51) Int. Cl.
*B62D 21/11* (2006.01)
*B60G 21/055* (2006.01)

(52) U.S. Cl.
CPC .......... *B60G 21/0551* (2013.01); *B62D 21/11* (2013.01); *B60G 2204/1222* (2013.01); *B60G 2204/15* (2013.01)

(58) Field of Classification Search
CPC ............................ B62D 21/11; B60G 21/0551
See application file for complete search history.

(56) References Cited

U.S. PATENT DOCUMENTS 2,952,454 A * 9/1960 Muller .................... B60G 9/00 267/189
5,573,274 A * 11/1996 Koketsu ................ B62D 21/11 180/297

(Continued)

FOREIGN PATENT DOCUMENTS

| | | | | |
|---|---|---|---|---|
| DE | 102006013548 B4 * | 3/2012 | ......... | B60G 21/0551 |
| EP | 1533151 A1 * | 5/2005 | ............... | B60G 7/02 |

(Continued)

OTHER PUBLICATIONS

Tisserand David, Horned Cradle for a Vehicle Front Axle Assembly With Antiroll Bar, Dec. 8, 2011, EPO, WO 2011/151571 A1, Machine Translation of Description (Year: 2011).*

(Continued)

*Primary Examiner* — James A English
(74) *Attorney, Agent, or Firm* — Oliff PLC

(57) ABSTRACT

A stabilizer support structure includes a suspension member in which a side rail portion and a cross-member portion are formed integrally, the suspension member including an upper suspension member that includes a first fastening portion at which a bracket is fastened at an intersection portion between the side rail portion and the cross-member portion, the bracket supporting a rod-shaped stabilizer whose length direction is in the vehicle width direction, and a lower suspension member that forms a closed cross section portion with the upper suspension member; and a reinforcing member that is joined to both the upper suspension member and the lower suspension member inside the closed cross section portion at the intersection portion, the reinforcing member spanning between the upper suspension member and the lower suspension member in the vehicle vertical direction, and being fastened together with the bracket via the first fastening portion.

5 Claims, 11 Drawing Sheets

(56) References Cited

U.S. PATENT DOCUMENTS

| | | | | |
|---|---|---|---|---|
| 2004/0021285 | A1 * | 2/2004 | Frasch | B60G 21/0551 280/124.109 |
| 2005/0212334 | A1 * | 9/2005 | Murata | B62D 21/11 296/204 |
| 2008/0309124 | A1 | 12/2008 | Yamagishi et al. | |
| 2010/0032920 | A1 * | 2/2010 | Hong | B60G 7/001 280/124.109 |
| 2012/0139204 | A1 * | 6/2012 | Jung | B60G 21/0551 280/124.106 |
| 2017/0066482 | A1 * | 3/2017 | Kaneko | B62D 25/2009 |

FOREIGN PATENT DOCUMENTS

| | | | | |
|---|---|---|---|---|
| EP | 2050597 | A1 * | 4/2009 | B60G 21/0551 |
| JP | 2009-023638 | A | 2/2009 | |
| JP | 2014-012488 | A | 1/2014 | |
| JP | 2014-118093 | A | 6/2014 | |
| JP | 2015-030380 | A | 2/2015 | |
| JP | 2015-101236 | A | 6/2015 | |
| WO | WO-2011151571 | A1 * | 12/2011 | B60G 21/0551 |

OTHER PUBLICATIONS

Yamagishi et al., Vehicle Front Body Structure, Feb. 5, 2009, JPO, JP 2009-023638 A, Machine Translation of Description (Year: 2009).*

* cited by examiner

STABILIZER SUPPORT STRUCTURE

CROSS-REFERENCE TO RELATED APPLICATION

This application is based on and claims priority under 35 USC 119 from Japanese Patent Application No. 2015-177894 filed on Sep. 9, 2015, the disclosure of which is incorporated by reference herein.

BACKGROUND

Technical Field

The present disclosure relates to a stabilizer support structure for an automobile.

Related Art

Commonly, at a stabilizer mounting portion of a suspension member that is for mounting of a stabilizer, vertical loads in a vehicle vertical direction from a tire are inputted through the stabilizer in accordance with road surface inputs. Japanese Patent Application Laid-Open (JP-A) No. 2015-101236 discloses a technology in which a bracket is fastened to a stabilizer mounting portion at an upper portion of a suspension member (an upper suspension member), a reinforcing member is coupled to the suspension member, and the reinforcing member and the bracket are fastened together. Thus, the stabilizer mounting portion may be reinforced. JP-A No. 2015-30380 discloses another technology relating to a mounting structure for a stabilizer.

However, if side rails and a cross-member of a suspension member are formed integrally, which is referred to as a “seamless structure”, there is no joining portion for coupling the side rail to the cross-member. Consequently, if one of these related art technologies is simply employed as a stabilizer support structure, an upper suspension member is vulnerable to deformation.

SUMMARY

In consideration of the circumstances described above, the present disclosure provides a stabilizer support structure for a suspension member with a seamless structure, in which deformation of an upper suspension member by a vertical load inputted to a stabilizer mounting portion may be suppressed.

An aspect of the present disclosure is a stabilizer support structure including: a suspension member in which a side rail portion that is disposed along a vehicle front-rear direction and a cross-member portion that is disposed along a vehicle width direction are formed integrally, the suspension member including; an upper suspension member that configures an upper portion with respect to a vehicle vertical direction of the suspension member, the upper suspension member including a first fastening portion at which a bracket is fastened at an intersection portion between the side rail portion and the cross-member portion, the bracket supporting a rod-shaped stabilizer having a length direction in the vehicle width direction, and a lower suspension member that configures a lower portion with respect to the vehicle vertical direction of the suspension member, the lower suspension member forming a closed cross section portion with the upper suspension member; and a reinforcing member that is joined to both the upper suspension member and the lower suspension member inside the closed cross section portion at the intersection portion, the reinforcing member spanning between the upper suspension member and the lower suspension member in the vehicle vertical direction, and being fastened together with the bracket via the first fastening portion.

In the present aspect, the side rail portion disposed along the vehicle front-rear direction and the cross-member portion disposed along the vehicle width direction are formed integrally in the suspension member. That is, the suspension member has a “seamless structure”. An upper portion in the vehicle vertical direction of the suspension member is structured by the upper suspension member, and a lower portion in the vehicle vertical direction of the suspension member is structured by the lower suspension member.

The first fastening portion is provided at the intersection portion of the upper suspension member between the side rail portion and the cross-member portion. The bracket that supports the rod-shaped stabilizer that is disposed with the length direction thereof in the vehicle width direction is fastened to the first fastening portion. The closed cross section portion is formed by the upper suspension member and the lower suspension member. Inside the closed cross section portion at the intersection portion of the suspension member, the reinforcing member is joined to both the upper suspension member and the lower suspension member, and the reinforcing member spans between the upper suspension member and lower suspension member in the vehicle vertical direction.

Therefore, the intersection portion of the suspension member is reinforced in the vehicle vertical direction by the reinforcing member, and deformation of the upper suspension member in response to a vertical load in the vehicle vertical direction that is inputted through the stabilizer to the upper suspension member may be suppressed. Moreover, because the reinforcing member spans across the suspension member in the vehicle vertical direction, relative displacement of the upper suspension member in the vehicle vertical direction with respect to the lower suspension member may be suppressed. Hence, deformation of the suspension member in the vehicle vertical direction may be suppressed.

The reinforcing member is fastened together with the bracket at the first fastening portion of the upper suspension member. Thus, the first fastening portion of the upper suspension member may be reinforced. Hence, deformation of the first fastening portion itself in response to a vertical load that is inputted to the first fastening portion may be suppressed.

In the present aspect, the upper suspension member may include first fastening holes that are formed in the first fastening portion so as to form a pair in the vehicle front-rear direction, and the reinforcing member may include: a second fastening portion that is fastened together with both the first fastening portion and the bracket; second fastening holes that are formed in the second fastening portion so as to form a pair in the vehicle front-rear direction in correspondence with the first fastening holes; and an upright wall portion that is formed at a vehicle width direction inner side of the suspension member relative to the second fastening portion, the upright wall portion being formed along the vehicle vertical direction and the vehicle front-rear direction inside the closed cross section portion at the intersection portion.

In the structure described above, the first fastening holes of the first fastening portion are formed so as to be in a pair along the vehicle front-rear direction. Meanwhile, at the reinforcing member, the second fastening holes of the second fastening portion that is fastened together with both the first fastening portion and the bracket are formed so as to be in a pair along the vehicle front-rear direction, in correspondence with the first fastening holes. At the reinforcing member, the upright wall portion is formed along the vehicle vertical direction and the vehicle front-rear direction inside the closed cross section portion at the intersection portion, at the inner side of the suspension member in the vehicle width direction relative to the second fastening portion.

Thus, at the reinforcing member, because the upright wall portion, which is disposed inside the closed cross section portion of the intersection portion of the suspension member, is arranged along the vehicle front-rear direction, the upright wall portion is disposed to be substantially parallel with the first fastening holes and second fastening holes that are provided in pairs along the vehicle front-rear direction. Therefore, in response to a vertical load that is inputted to the suspension member, vertical loads that are substantially equally dispersed to respective front portion sides and rear portion sides in the vehicle front-rear direction are inputted through the upright wall portion to the pairs of first fastening holes and second fastening holes. Hence, deformations of the first fastening portion and the second fastening portion themselves may be suppressed.

In the present aspect, the reinforcing member may further include a protruding portion that protrudes from the second fastening portion toward an outer side in the vehicle width direction of the suspension member, a distal end portion of the protruding portion being joined to one of an outer wall portion that extends down from an outer edge portion of an upper wall portion of the upper suspension member or an outer wall portion that rises up from an outer edge portion of a lower wall portion of the lower suspension member.

In the structure described above, the protruding portion of the reinforcing member protrudes from the second fastening portion to the outer side of the suspension member in the vehicle width direction. The distal end portion of the protruding portion is joined to the outer wall portion that hangs down from the outer edge portion of the upper wall portion of the upper suspension member or the outer wall portion that rises from the outer edge portion of the lower wall portion of the lower suspension member. Thus, because the protruding portion of the reinforcing member is joined from the second fastening portion to the outer wall portion of the upper suspension member or the outer wall portion of the lower suspension member, strength and stiffness of the second fastening portion may be improved compared to a structure in which a protruding portion is formed as a cantilever support structure.

In the present aspect, the upper suspension member may be joined to a body mount that is for mounting of the suspension member to a vehicle framework side, and a joining portion between the upper suspension member and the body mount may include a lateral joining portion that is joined along a horizontal direction and an upright joining portion that is joined along the vehicle vertical direction.

In the structure described above, the body mount is joined to the suspension member at a joining portion. The joining portion is provided with the lateral joining portion and the upright joining portion, joining along the horizontal direction at the lateral joining portion and joining along the vehicle vertical direction at the upright joining portion.

A vertical load that is inputted to the upper suspension member is transmitted from the upper suspension member through the lateral coupling portion and the upright coupling portion to the body mount side thereof. That is, load transmission paths along which a load is transmitted from the upper suspension member to the body mount side may be increased in number. Thus, out-of-plane deformation of the upper suspension member may be effectively suppressed.

As described above, a stabilizer support structure relating to the present disclosure may suppress deformation of a upper suspension member by a vertical load that is inputted to a stabilizer mounting portion of a suspension member with what is known as a seamless structure.

BRIEF DESCRIPTION OF THE DRAWINGS

Exemplary embodiments of the present disclosure will be described in detail based on the following figures, wherein.

DETAILED DESCRIPTION

Figure 1:
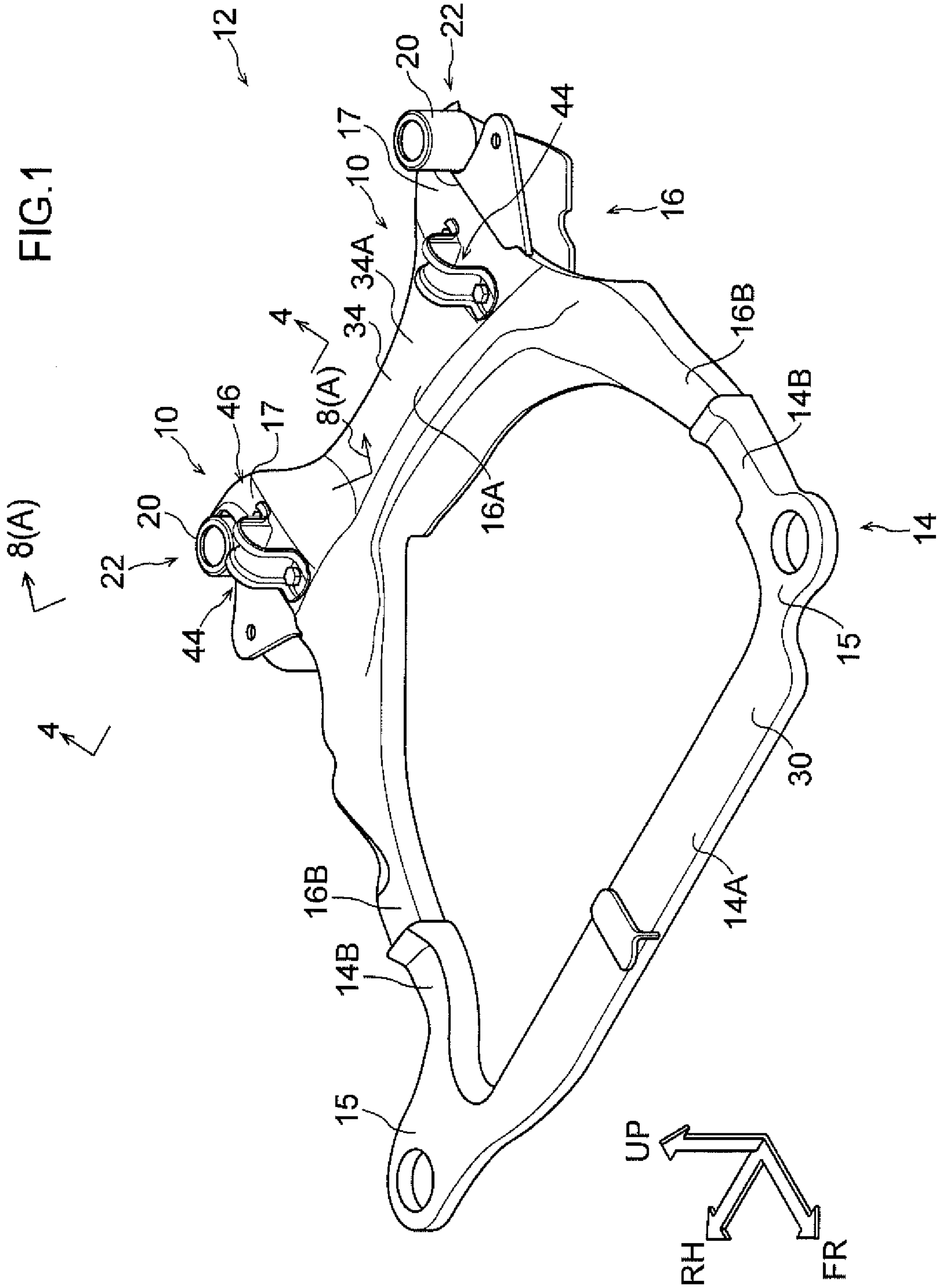
FIG. 1 is a perspective view showing a suspension member at which a stabilizer support structure in accordance with an exemplary embodiment is employed, viewed diagonally from the front-right side thereof.

A stabilizer support structure according to an exemplary embodiment of the present disclosure is described in accordance with the drawings. The arrow FR, arrow UP and arrow RH marked in the drawings indicate, respectively, a forward direction (a progress direction), an upward direction and a vehicle rightward direction of a vehicle (an automobile) in which the stabilizer support structure is employed.

—Structure of Suspension Member—

Before structures of the stabilizer support structure according to the present exemplary embodiment are described, a front suspension member (herebelow referred to simply as “the suspension member”) at which the stabilizer support structure is employed is described.

A suspension member 12 which is shown in FIG. 1 is supported at front side members (not shown in the drawings) that are arranged along the vehicle front-rear direction at vehicle width direction outer sides of a vehicle body. The suspension member 12 is formed as a framework body in a substantially rectangular frame shape in plan view. The suspension member 12 is divided into front and rear with respect to the front-rear direction (see FIG. 2), including a front cross-member 14 that is disposed at a front portion in the vehicle front-rear direction and a rear cross-member 16 that is disposed at a rear portion in the vehicle front-rear direction. A stabilizer 42, which is described below, is mounted at the side of the suspension member 12 at which the rear cross-member 16 is provided.

The front cross-member 14 is formed substantially in an inverted “U” shape in plan view that opens toward the side thereof at which the rear cross-member 16 is disposed. The front cross-member 14 includes a cross-member portion 14A that is arranged along the vehicle width direction and a pair of left and right side rail portions 14B that are arranged along the vehicle front-rear direction. The side rail portions 14B inflect from the two vehicle width direction end portions of the cross-member portion 14A towards the side at which the rear cross-member 16 is disposed. The rear cross-member 16 is formed substantially in a “U” shape in plan view that opens toward the side thereof at which the front cross-member 14 is disposed. The rear cross-member 16 includes a cross-member portion 16A that is arranged along the vehicle width direction and a pair of left and right side rail portions 16B that are arranged along the vehicle front-rear direction. The side rail portions 16B curve from the two vehicle width direction end portions of the cross-member portion 16A towards the outer sides in the vehicle width direction and towards the side at which the front cross-member 14 is disposed. The side rail portions 14B of the front cross-member 14 and the side rail portions 16B of the rear cross-member 16 are coupled to one another and made integral (a “seamless structure”).

For example, although not shown in the drawings, in an ordinary suspension member, respective vehicle width direction end portions of a front cross-member and a rear cross-member that are arranged along the vehicle width direction are coupled to one another by a pair of side rails that are arranged along the vehicle front-rear direction. In this case, the suspension member is structured by four framework portions (this is referred to as a related art structure). In contrast, in a case of a suspension member with the seamless structure described above, the suspension member is structured by two framework portions. Therefore, when a suspension member with a seamless structure is employed, a number of components and a number of work steps may be reduced compared to a suspension member with the related art structure. In addition, a reduction in weight of the suspension member may be achieved.

Figure 2:
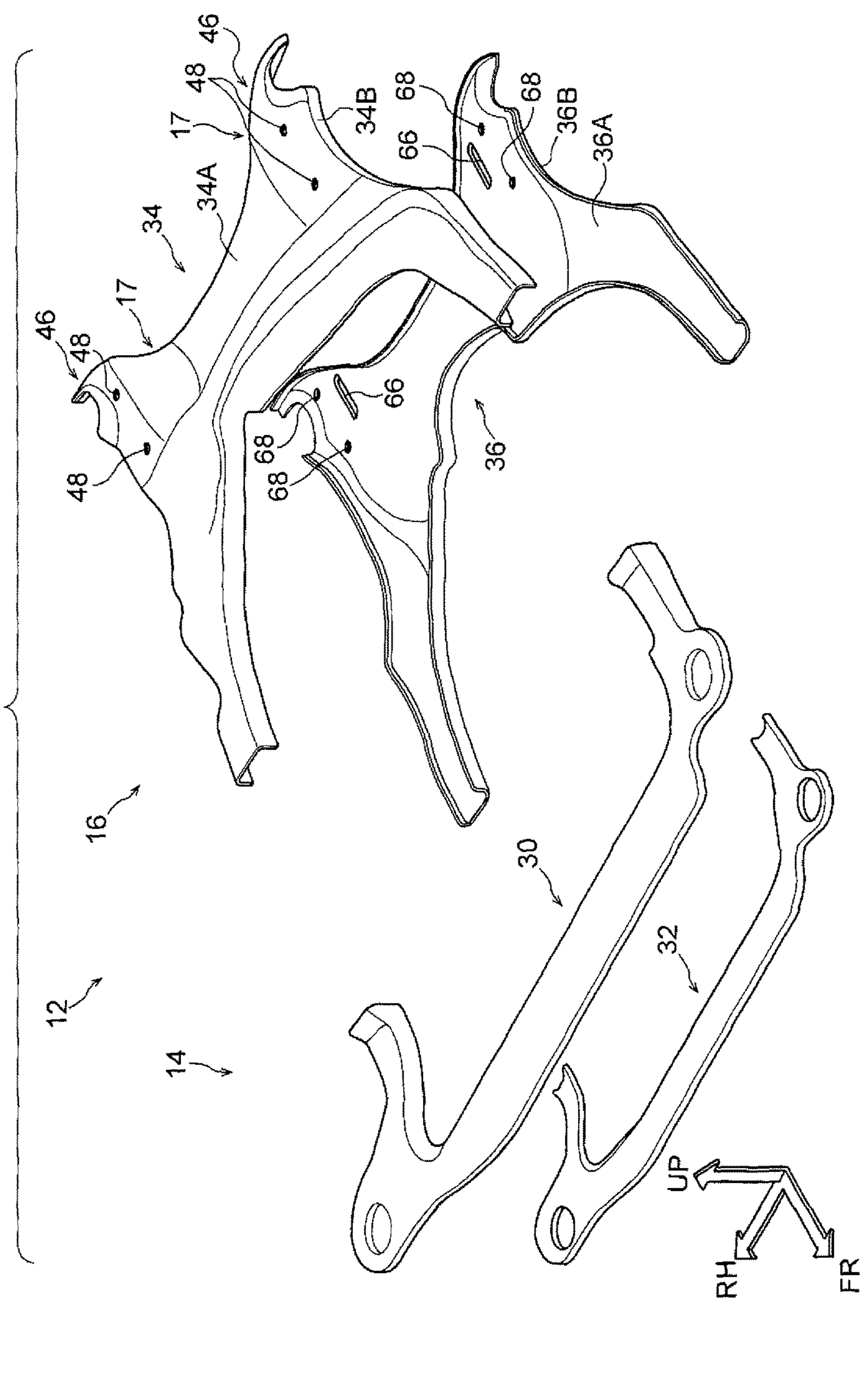
FIG. 2 is an exploded perspective view showing structures of a suspension member with a seamless structure.

As shown in FIG. 2, the front cross-member 14 and rear cross-member 16 that structure the suspension member 12 with the seamless structure are each divided into upper and lower parts. Specifically, the front cross-member 14 is provided with an upper front cross 30 that structures an upper portion of the front cross-member 14 and a lower front cross 32 that structures a lower portion of the front cross-member 14. The rear cross-member 16 is provided with an upper rear cross (upper suspension member) 34 that structures an upper portion of the rear cross-member 16 and a lower rear cross (lower suspension member) 36 that structures a lower portion of the rear cross-member 16.

As shown in FIG. 1, body mounts 20 for mounting the suspension member 12 to the body (vehicle framework), which are formed in substantially tubular shapes, are provided with body mount support portions 22. The body mount support portions 22 are coupled to the suspension member 12 at respective intersection portions 15 between the cross-member portion 14A and the side rail portions 14B of the front cross-member 14, and at respective intersection portions 17 between the cross-member portion 16A and the side rail portions 16B of the rear cross-member 16. The body mount support portions 22 at the side at which the rear cross-member 16 is disposed are shown in this drawing, but the body mount support portions 22 are not shown in the drawings of, for example, FIG. 2 and FIG. 3.

—Structure of Stabilizer Support Member—

Below, the rear cross-member 16, at which a stabilizer support structure 10 according to the present exemplary embodiment is employed, is described.

As shown in FIG. 2, a cross-sectional shape of the upper rear cross 34 that structures the upper portion of the rear cross-member 16, if cut along a width direction substantially orthogonal to a length direction thereof, is formed substantially in an inverted “U” shape of which the lower side is open. The upper rear cross 34 includes an upper wall portion 34A, which structures a main body of the upper rear cross 34, and outer wall portions 34B, which extend down from outer edge portions of the upper wall portion 34A.

A cross-sectional shape of the lower rear cross 36 that structures the lower portion of the rear cross-member 16, if cut along a width direction substantially orthogonal to a length direction thereof, is formed substantially in a “U” shape of which the upper side is open. The lower rear cross 36 includes a lower wall portion 36A, which structures a main body of the lower rear cross 36, and outer wall portions 36B, which rise up from outer edge portions of the lower wall portion 36A.

Figure 4:
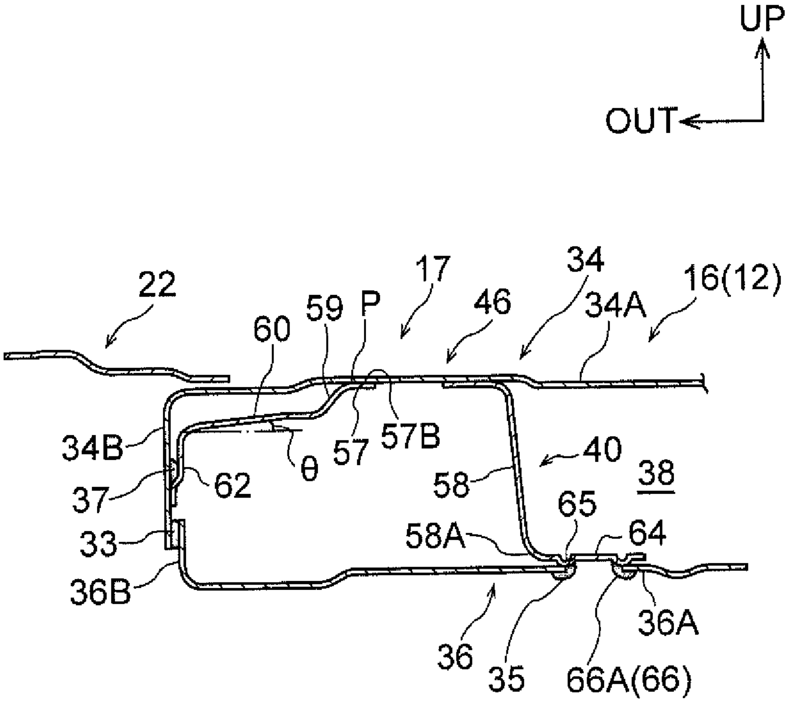
FIG. 4 is a sectional diagram cut along line 4-4 in FIG. 1.

The upper rear cross 34 and lower rear cross 36 are superposed from above and below and, as shown in FIG. 4, each outer wall portion 36B of the lower rear cross 36 is joined to the corresponding outer wall portion 34B of the upper rear cross 34 (at a joining portion 33). In this state, a closed cross section portion 38 is structured by the upper rear cross 34 and the lower rear cross 36. A stabilizer reinforcement 40 is disposed inside the closed cross section portion 38 at each intersection portion 17 of the rear cross-member 16 to serve as a reinforcing member.

In the present exemplary embodiment, the meaning of the term “join” encompasses welding by spot welding, arc welding, laser screw welding (LSW) and so forth, and the meaning of the term “fasten” encompasses, beside bolt fastening, rivet fastening, crimp fastening and so forth. The meaning of the term “couple” encompasses the meanings of the terms “join” and “fasten”.

Figure 3:
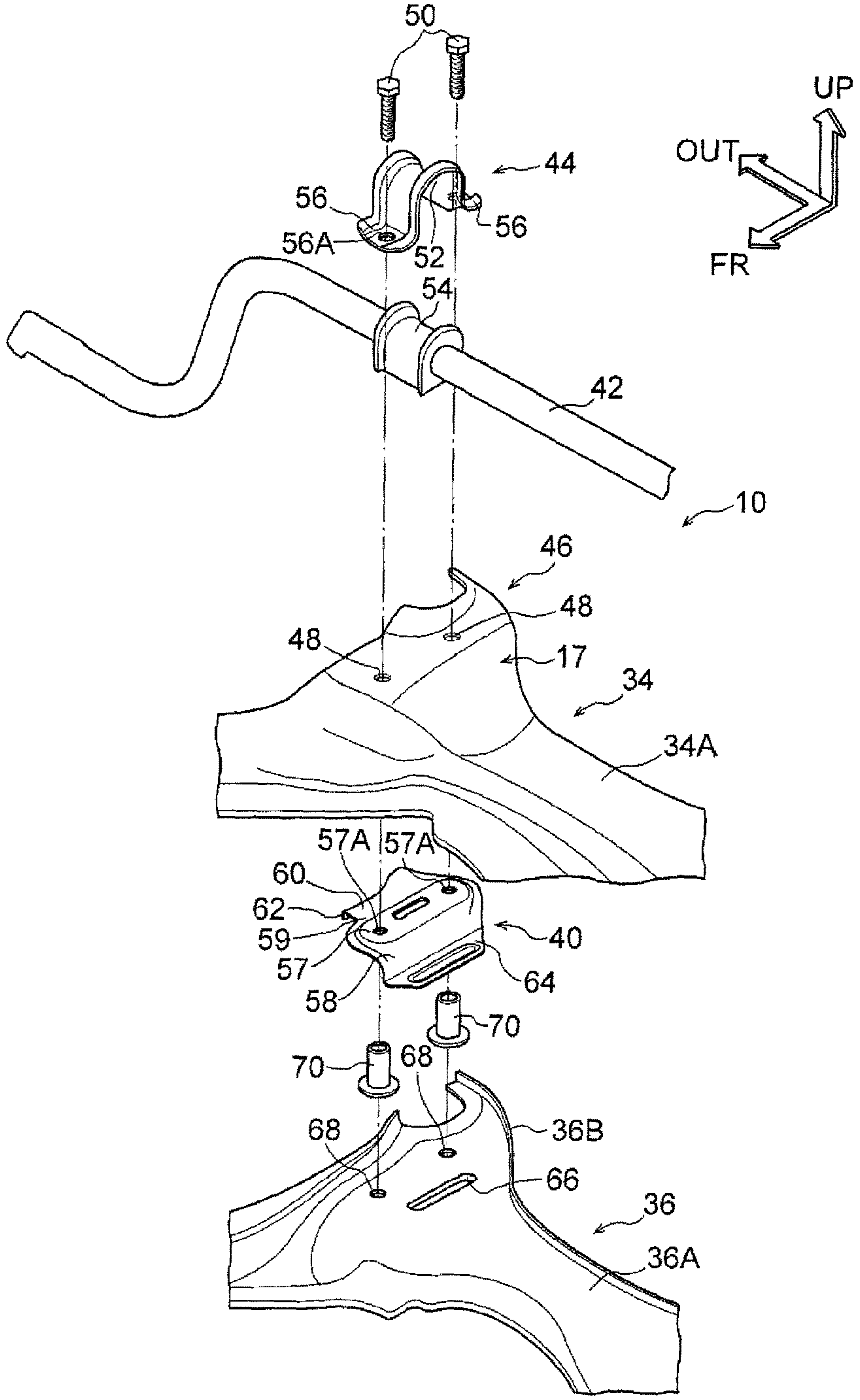
FIG. 3 is an exploded perspective view showing structures of the stabilizer support structure in accordance with the exemplary embodiment.

As shown in FIG. 1 to FIG. 3, a stabilizer mounting portion 46 that serves as a first fastening portion is provided at each intersection portion 17 of the upper wall portion 34A of the upper rear cross 34. A stabilizer support bracket (below referred to as the “stabilizer bracket”) 44 that serves as a bracket supporting the stabilizer 42 is mounted at the stabilizer mounting portion 46.

A pair of fastening holes (first fastening holes) 48 are formed along the vehicle front-rear direction in the stabilizer mounting portion 46. Bolts 50 are insertable into the fastening holes 48. In a side view (seen from a vehicle sideward side), the stabilizer bracket 44 is formed substantially in an inverted "U" shape of which the lower side is open. A support portion 52 that supports the stabilizer 42 is provided at a central portion of the stabilizer bracket 44. A bush 54 is fitted round each of two end portion sides of a length direction of the stabilizer 42. The stabilizer 42 is supported by the support portion 52 via the bush 54.

Fixing pieces 56 are provided protruding to outer sides from two end portions of the support portion 52, in directions away from one another. A fastening hole 56A is formed in each fixing piece 56. The bolts 50 are insertable into the fastening holes 56A. The bolts 50 are inserted through the fastening holes 56A and the fastening holes 48. Thus, the stabilizer bracket 44 is fixed to the upper wall portion 34A (the stabilizer mounting portion 46) of the upper rear cross 34 via the bolts 50.

As shown in FIG. 3 and FIG. 4, each stabilizer reinforcement 40 is formed in a substantial crank shape in side view (seen from the vehicle sideward side). The stabilizer reinforcement 40 includes a fastening portion (a second fastening portion) 57, an upright wall portion 58 and a joining piece 64. The fastening portion 57 is formed so as to be substantially parallel with the upper wall portion 34A of the upper rear cross 34, and is formed so as to be arranged along the vehicle width direction.

A pair of fastening holes (second fastening holes) 57A are formed in the fastening portion 57. The fastening holes 57A are arranged substantially in parallel with the upright wall portion 58. The fastening holes 57A are formed so as to correspond with the fastening holes 48 formed in the upper wall portion 34A of the upper rear cross 34, and the bolts 50 are insertable into the fastening holes 57A.

The upright wall portion 58 is formed to be connected with the fastening portion 57, at the vehicle width direction inner side of the rear cross-member 16 with respect to the fastening portion 57. The upright wall portion 58 is formed so as to be substantially orthogonal to the fastening portion 57, being formed so as to be arranged along the vertical direction of the rear cross-member 16.

Figure 6:
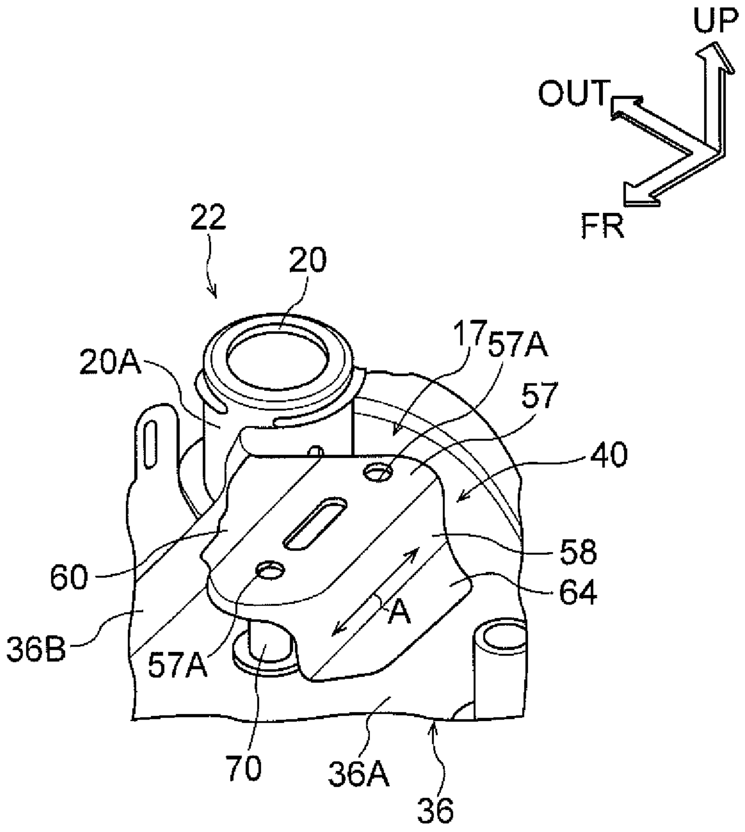
FIG. 6 is a perspective view showing the stabilizer reinforcement and lower suspension member that structure the stabilizer support structure in accordance with the exemplary embodiment, viewed from the vehicle width direction inner side and upper side thereof.

The upright wall portion 58 is formed so as to be arranged along the vehicle front-rear direction in the state in which the stabilizer reinforcement 40 is fixed to the upper wall portion 34A of the upper rear cross 34 (see arrow A in FIG. 6). Thus, the upright wall portion 58 is arranged in a direction substantially orthogonal to the vehicle width direction of the rear cross-member 16, inside the closed cross section portion 38 of the rear cross-member 16.

The joining piece 64 protrudes from a lower end portion 58A of the upright wall portion 58. The joining piece 64 is inflected toward the vehicle width direction inner side of the rear cross-member 16. The joining piece 64 is joined to the lower wall portion 36A of the lower rear cross 36 (at a joining portion 35).

Figure 5:
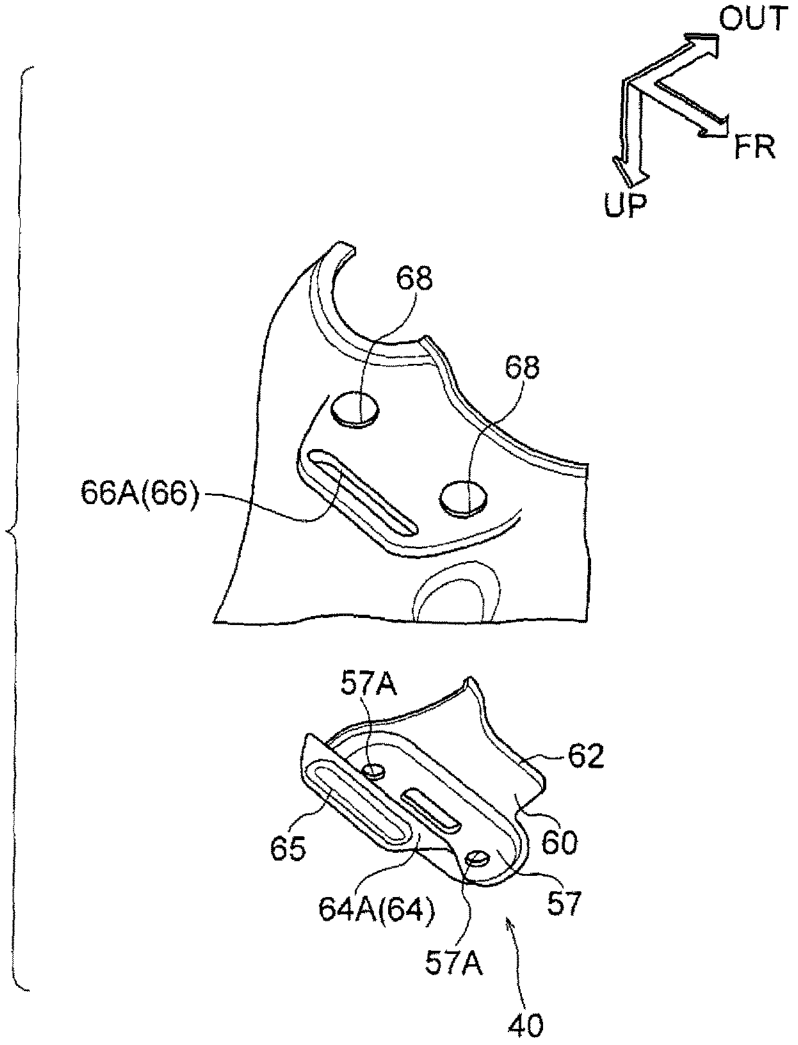
FIG. 5 is an exploded perspective view showing a lower suspension member and a stabilizer reinforcement that structure the stabilizer support structure in accordance with the exemplary embodiment, viewed from the lower side thereof.

Specifically, as shown in FIG. 4 and FIG. 5, a joining surface 64A of the joining piece 64 is joined to the lower wall portion 36A of the lower rear cross 36. A boss portion 65 in an oval shape whose length is along the vehicle front-rear direction is provided projecting from the joining surface 64A. A long hole portion 66 is formed in the lower rear cross 36, in a region against which the boss portion 65 abuts. The boss portion 65 abuts against an inner edge portion 66A of the long hole portion 66. Thus, the joining piece 64 of the stabilizer reinforcement 40 is positioned with respect to the inner edge portion 66A of the lower rear cross 36. The joining piece 64 is joined via the long hole portion 66 by arc welding, laser welding or the like (at the joining portion 35).

As shown in FIG. 3 and FIG. 5, a pair of fastening holes 68 are formed along the vehicle front-rear direction in the lower wall portion 36A of the lower rear cross 36, at the vehicle width direction outer side of the suspension member 12 relative to the long hole portion 66. The pair of fastening holes 68 are formed so as to correspond with the fastening holes 57A of the stabilizer reinforcement 40, and the bolts 50 are insertable therein. Collars 70 are interposed between the fastening portion 57 of the stabilizer reinforcement 40 and the lower wall portion 36A of the lower rear cross 36.

In a state in which the bolts 50 are inserted into the fastening holes 48 of the upper rear cross 34, the bolts 50 are inserted into the fastening holes 57A of the stabilizer reinforcement 40. Then, in the present exemplary embodiment, the bolts 50 are inserted through the collars 70 and the pair of fastening holes 68 formed in the lower wall portion 36A of the lower rear cross 36, and are screwed into nuts, which are not shown in the drawings.

Thus, the stabilizer bracket 44, the upper rear cross 34, the stabilizer reinforcement 40 and the lower rear cross 36 are fastened to one another. In other words, the stabilizer reinforcement 40 is fastened together with both the stabilizer bracket 44 and the upper wall portion 34A of the upper rear cross 34. In this state, the stabilizer reinforcement 40 spans across the suspension member 12 in the vehicle vertical direction (see FIG. 4).

In the present exemplary embodiment, as shown in FIG. 4, a protruding portion 60 protrudes from the vehicle width direction outer side with respect to the rear cross-member 16 of the fastening portion 57. The protruding portion 60 is formed to be at an angle θ relative to a fastening surface 57B of the fastening portion 57. The angle θ is an angle that is at least 0° and at most 90°. For example, in FIG. 4 the angle θ is set to approximately 10°.

Figure 7:
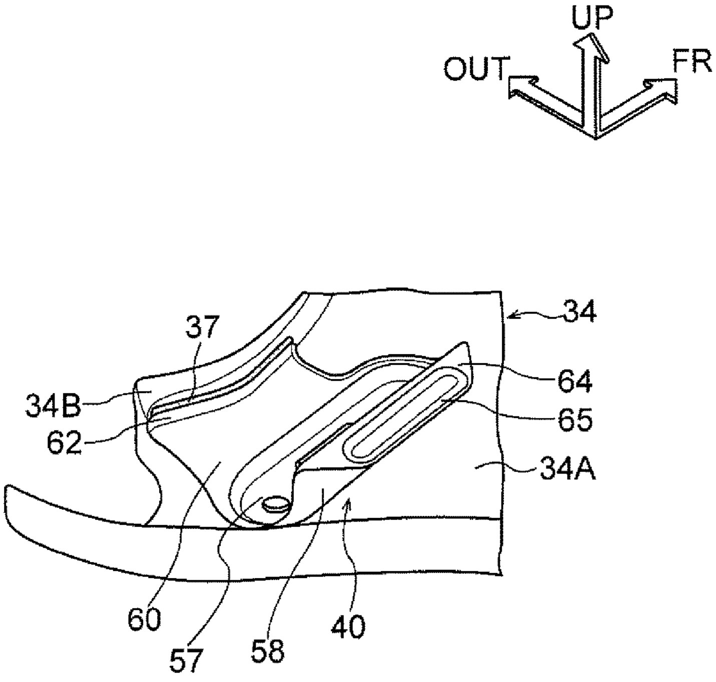
FIG. 7 is a perspective view of the stabilizer reinforcement and a upper suspension member that structure the stabilizer support structure in accordance with the exemplary embodiment, viewed from the lower side thereof.

A joining piece 62 is provided at a distal end portion of the protruding portion 60. The joining piece 62 is inflected toward the lower side. As shown in FIG. 4 and FIG. 7, the joining piece 62 is joined to the outer wall portion 34B of the upper rear cross 34 (at a joining portion 37). In the present exemplary embodiment, an angled portion 59 is provided between the fastening portion 57 and the protruding portion 60. The angled portion 59 is angled to the lower side from the fastening portion 57 toward the outer side in the vehicle width direction of the rear cross-member 16.

Figure 8A:
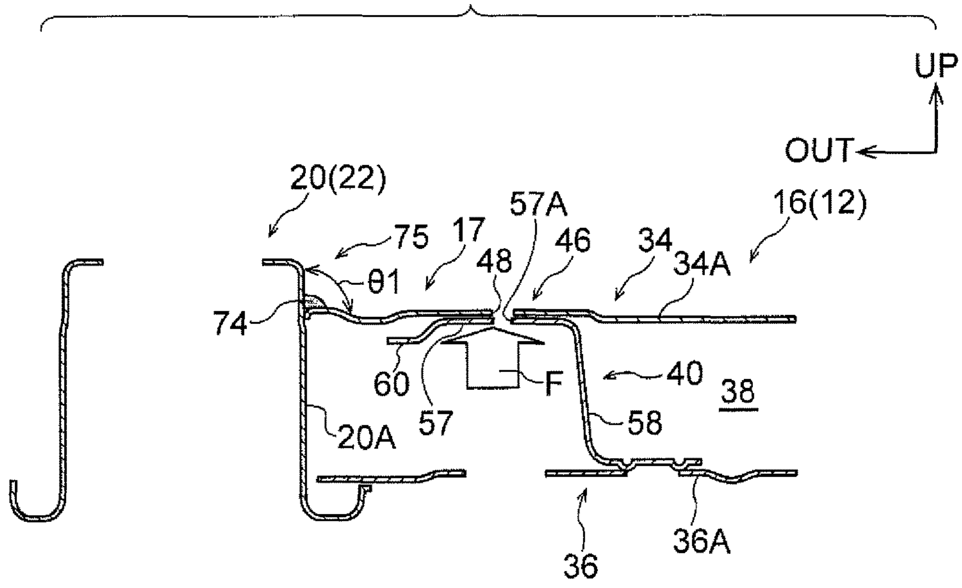
FIG. 8A is a sectional diagram cut along line 8(A)-8(A) in FIG. 1.
Figure 9:
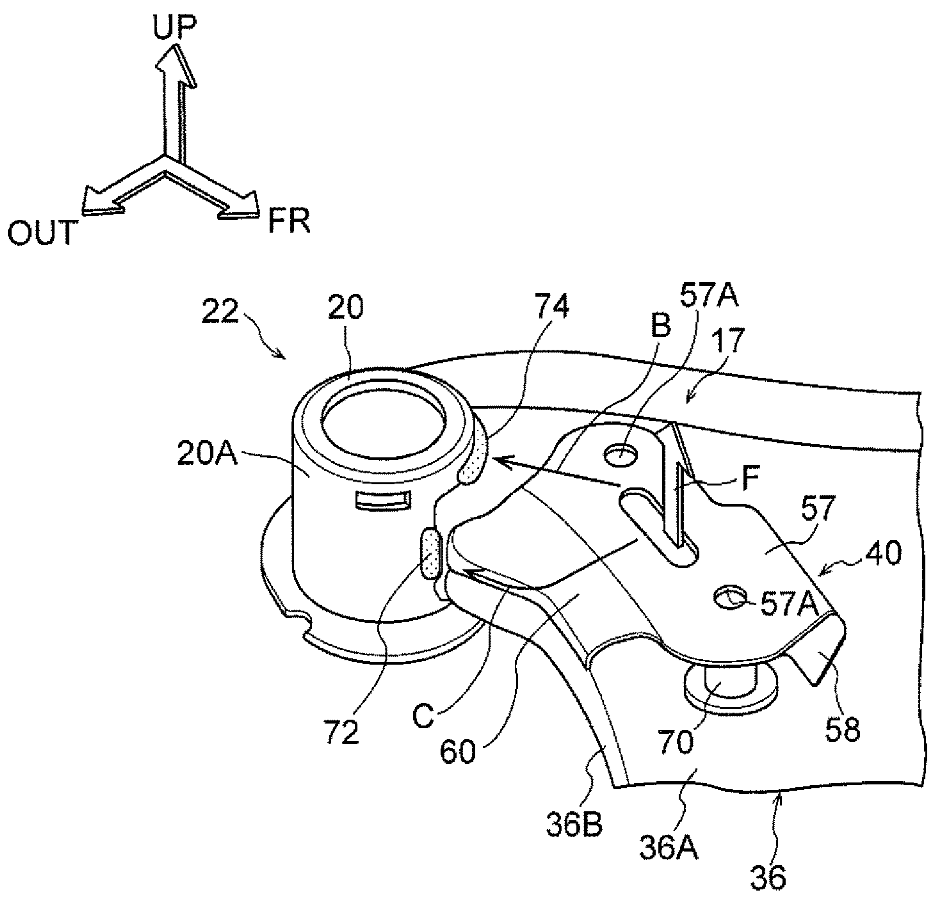
FIG. 9 is a perspective view showing the stabilizer reinforcement and lower suspension member that structure the stabilizer support structure in accordance with the exemplary embodiment, viewed from the vehicle width direction outer side and upper side thereof.

In the present exemplary embodiment, as shown in FIG. 8A and FIG. 9, the upper rear cross 34 is joined to a periphery wall portion 20A of each body mount 20 along a peripheral direction and an axial direction of the periphery wall portion 20A. Although the upper rear cross 34 is not shown in FIG. 9, a joining portion at which the upper rear cross 34 is joined along the axial direction of the periphery wall portion 20A of the body mount 20 is an upright joining portion 72, and a joining portion at which the upper rear cross 34 is joined along the peripheral direction of the periphery wall portion 20A of the body mount 20 is a lateral joining portion 74. The lateral joining portion 74 is disposed so as to be at substantially the same height as the joining piece 62 of the stabilizer reinforcement 40.

—Operation and Effects of Stabilizer Support Member—

Now, operation and effects of the stabilizer support member according to the present exemplary embodiment are described.

In a suspension member with the related art structure, as described above, the suspension member is structured by a front cross-member, a rear cross-member and a pair of side rails. Therefore, coupling portions are provided at both vehicle width direction end portions of the front cross-member and the rear cross-member. The two vehicle width direction end portions of each of the front cross-member and the rear cross-member are connected to the side rails via these coupling portions.

Figure 10A:
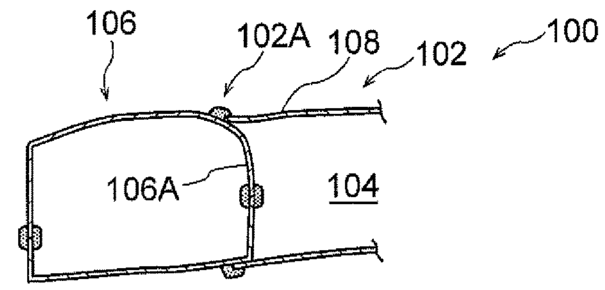
FIG. 10A is a schematic sectional diagram corresponding to FIG. 4, showing a suspension member with a related art structure.

Specifically, as shown in FIG. 10A, in a suspension member 100 with the related art structure, a side wall portion 106A of a side rail 106 is disposed to serve as the aforementioned upright wall portion inside a closed cross section 104 at each of coupling portions 102A of a rear cross-member 102. Accordingly, strength and rigidity may be provided to the rear cross-member 102. Consequently, even if a vertical load in the vehicle vertical direction is inputted through a stabilizer to a stabilizer mounting portion of an upper rear cross 108 that structures an upper portion of the rear cross-member 102, deformation of the rear cross-member 102 may be suppressed.

Figure 10B:
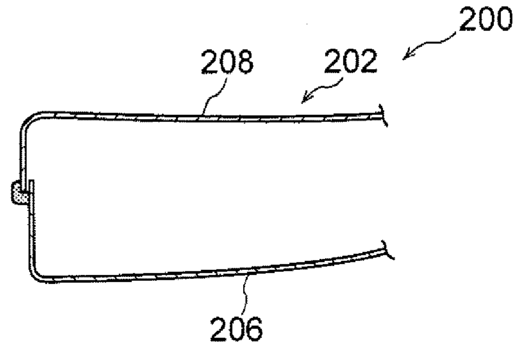
FIG. 10B is a schematic sectional diagram corresponding to FIG. 10A, showing a suspension member with a seamless structure.
Figure 11A:
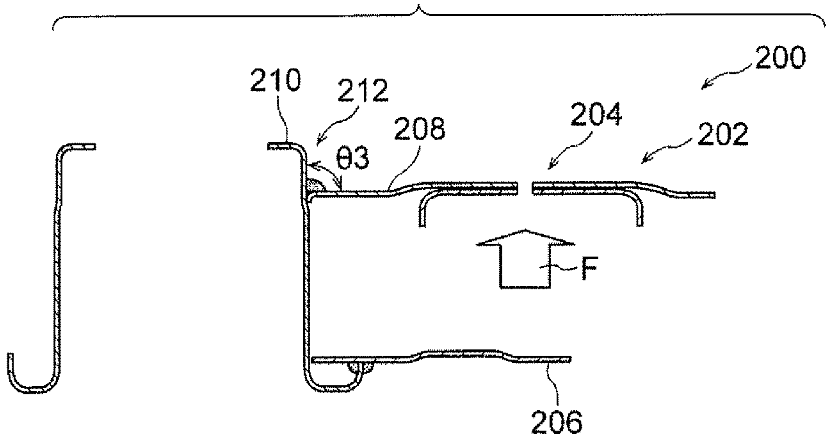
FIG. 11A and FIG. 11B are a comparative example, corresponding to FIG. 8A and FIG. 8B, respectively.
Figure 11B:
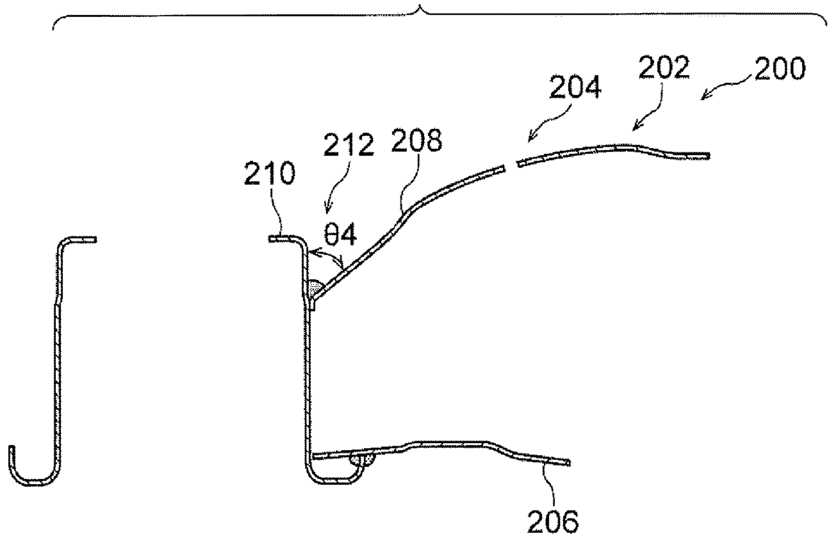

However, in a suspension member that employs the "seamless structure", for example, as shown in FIG. 10B, the coupling portion of the related art structure is not present in a suspension member 200. Therefore, as shown in FIG. 11A, if a vertical load F is inputted to a stabilizer mounting portion 204 of a rear cross-member 202 of the suspension member 200, then as shown in FIG. 11B, an upper rear cross 208 deforms relative to a lower rear cross 206. As a result, an angle θ4 formed between the upper rear cross 208 and a body mount 210 at a coupling portion 212 between the upper rear cross 208 and the body mount 210 changes greatly (angle θ4<angle θ3; see FIG. 11A).

Figure 8B:
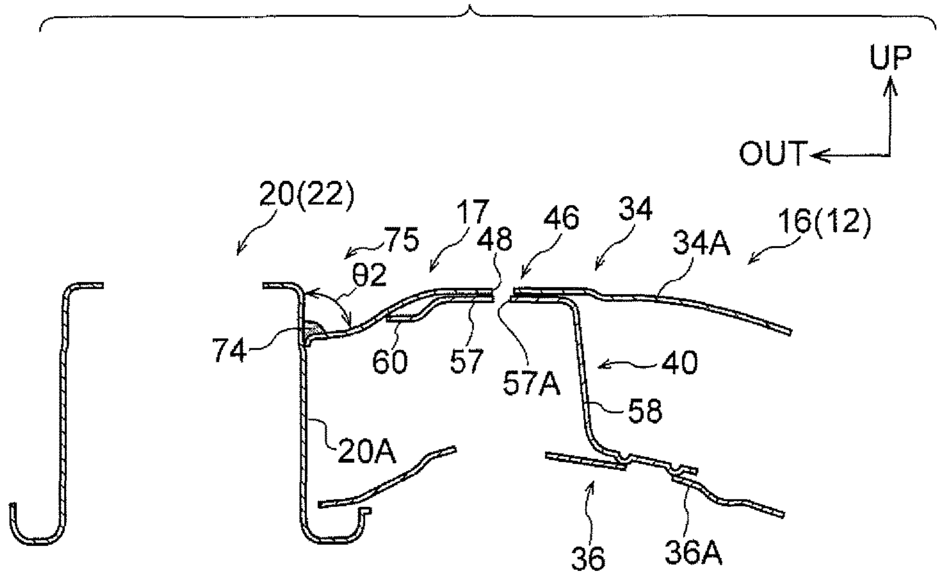
FIG. 8B is a sectional diagram corresponding to FIG. 8A, showing a situation in which a vertical load is inputted to a stabilizer mounting portion at which the stabilizer is mounted.

In contrast, in the present exemplary embodiment, as shown in FIG. 8A and FIG. 8B, the stabilizer reinforcement 40 is coupled to the upper rear cross 34 and the lower rear cross 36 and spans in the vehicle vertical direction across the interior of the closed cross section portion 38 provided at each intersection portion 17 of the rear cross-member 16.

Thus, the rear cross-member 16 is reinforced with respect to a load input direction that is in the vehicle vertical direction. Hence, deformation (out-of plane deformation) of the upper rear cross 34 in response to a vertical load F inputted through the stabilizer 42 (see FIG. 3) to the upper rear cross 34 may be suppressed. Thus, because deformation of the upper rear cross 34 is suppressed, a change in angle of an angle θ1 formed between the upper rear cross 34 and the body mount 20 at a joining portion 75 between the upper rear cross 34 and the body mount 20 (from angle θ1 to angle θ2) may be suppressed (see FIG. 8B).

In the present exemplary embodiment, because the stabilizer reinforcement 40 is joined to the upper rear cross 34 and the lower rear cross 36 and spans therebetween in the vehicle vertical direction, relative displacement in the vehicle vertical direction of the upper rear cross 34 with respect to the lower rear cross 36 may be suppressed. As a result, deformation of the rear cross-member 16 in the vehicle vertical direction may be suppressed.

In the present exemplary embodiment, the fastening portion 57 of the stabilizer reinforcement 40 is fastened to (fastened together with) both the stabilizer bracket 44 (see FIG. 3) and the upper rear cross 34. Thus, the fastening portion 57 and the stabilizer mounting portion 46 of the upper rear cross 34 may be reinforced, and stiffness of the fastening portion 57 and the stabilizer mounting portion 46 may be improved. Hence, deformation (out-of-plane deformation) of the fastening portion 57 and the stabilizer mounting portion 46 in response to a vertical load F may be suppressed.

According to the structure described above, as shown in FIG. 8A and FIG. 8B, because deformation of the rear cross-member 16 is suppressed, a stiffness equal to or higher than that of the suspension member 200 with the related art structure (see FIG. 11A and FIG. 11B) may be provided even though a seamless structure is employed. Thus, in a vehicle in which the suspension member 12 is disposed, steering stability may be improved.

In the present exemplary embodiment, the upright wall portion 58 of the stabilizer reinforcement 40 is provided at the vehicle width direction inner side of the suspension member 12 relative to the fastening portion 57. As described above, in the suspension member 200 with the seamless structure shown in FIG. 11A and FIG. 11B, when a vertical load F is inputted to the stabilizer mounting portion 204 of the rear cross-member 202, the upper rear cross 208 is deformed relative to the lower rear cross 206 via the stabilizer mounting portion 204. Because the upper rear cross 208 is joined to the body mount 210 at the vehicle width direction outer side of the suspension member 200, a deformation amount of the upper rear cross 208 increases from the body mount 210 toward the vehicle width direction inner side of the suspension member 200.

Therefore, in the present exemplary embodiment, the upright wall portion 58 is provided at the vehicle width direction inner side of the suspension member 12 relative to the fastening portion 57 disposed at the stabilizer mounting portion 46, as shown in FIG. 8A and FIG. 8B. As a result, deformation of the upper rear cross 34 may be suppressed effectively.

In addition, the upright wall portion 58 of the stabilizer reinforcement 40 is disposed along the vehicle vertical direction inside the closed cross section portion 38 of the rear cross-member 16, being joined to the upper rear cross 34 and the lower rear cross 36, and is disposed along the vehicle front-rear direction (see FIG. 6). In this structure, as shown in FIG. 3, the fastening holes 48 of the stabilizer mounting portion 46 and the fastening holes 57A of the fastening portion 57 are formed in pairs along the vehicle front-rear direction. Thus, the upright wall portion 58 is disposed to be substantially parallel with the pairs of fastening holes 48 and fastening holes 57A. Therefore, in response to a vertical load F that is inputted to the suspension member 12 (see FIG. 8A), vertical loads that are substantially equally dispersed in the vehicle front-rear direction between the respective front portion sides and rear portion sides of the pairs of fastening holes 48 and fastening holes 57A are inputted via the upright wall portion 58. As a result, deformation of the stabilizer mounting portion 46 and the fastening portion 57 themselves may be suppressed.

As shown in FIG. 4, in the present exemplary embodiment, the protruding portion 60 of the stabilizer reinforcement 40 protrudes from the vehicle width direction outer side of the suspension member 12 of the fastening portion 57. The joining piece 62 that is provided at the distal end portion of the protruding portion 60 is joined to the outer wall portion 34B of the upper rear cross 34. Therefore, strength and stiffness of the fastening portion 57 may be improved and deformation of the fastening portion 57 may be suppressed compared to, for example, a structure in which the protruding portion 60 is formed in a cantilever support structure.

The protruding portion 60 is disposed such that the angle θ thereof with respect to the fastening surface 57B of the fastening portion 57 is approximately 10°. Thus, because the protruding portion 60 is at an angle (intersectingly formed) relative to the fastening surface 57B of the fastening portion 57, in the state in which the protruding portion 60 is joined to the outer wall portion 34B of the upper rear cross 34, the protruding portion 60 plays a similar role to a "brace".

Therefore, stiffness of the fastening portion 57 may be further improved and out-of-plane deformation of the upper rear cross 34 in response to a vertical load F inputted to the upper rear cross 34 may be suppressed further. In-plane deformation of the upper rear cross 34 in response to a load in the vehicle width direction may also be suppressed.

As shown in FIG. 8A and FIG. 9, the upper rear cross 34 (see FIG. 8A) is joined to the periphery wall portion 20A of the body mount 20 via the upright joining portion 72 that is joined along the peripheral direction and the lateral joining portion 74 that is joined along the axial direction. Therefore, an input load F that is inputted to the upper rear cross 34 is transmitted from the upper wall portion 34A of the upper rear cross 34 through the upright joining portion 72 to the side of the body mount 20 (arrow C) and is transmitted through the lateral joining portion 74 to the side of the body mount 20 (arrow B).

In particular, in the present exemplary embodiment, as shown in FIG. 4 and FIG. 9, the fastening portion 57 of the stabilizer reinforcement 40 is coupled to the upper wall portion 34A of the upper rear cross 34, and the joining piece 62 at the distal end portion of the protruding portion 60 that is at the angle θ relative to the fastening surface 57B of the fastening portion 57 is joined to the outer wall portion 3413 of the upper rear cross 34 (at the joining portion 37; see FIG. 4).

Thus, in this structure, a vertical load F that is inputted to the upper rear cross 34 is transmitted from the upper wall portion 34A of the upper rear cross 34 to the fastening portion 57 of the stabilizer reinforcement 40 and, separately from the upper rear cross 34, a load is transmitted from the fastening portion 57 through the protruding portion 60, the joining piece 62 and the joining portion 37 and through the outer wall portion 34B of the upper rear cross 34 to the side of the body mount 20 (arrow C).

Thus, in the present exemplary embodiment, load transmission paths along which the load is transmitted from the suspension member 12 to the side of the body mount 20 may be increased in number (arrows B and C), and out-of-plane deformation of the upper rear cross 34 may be suppressed effectively. Further, because the vertical load F that is inputted to the upper rear cross 34 is experienced by the upright joining portion 72 as a load in a shear direction, the upright joining portion 72 is unlikely to separate.

As described above, in the present exemplary embodiment, as shown in FIG. 4, the protruding portion 60 of the stabilizer reinforcement 40 is formed to be at the angle θ with respect to the fastening surface 57B of the fastening portion 57. Thus, a ridgeline P is formed between the fastening portion 57 and the protruding portion 60. Therefore, strength and stiffness of the stabilizer reinforcement 40 may be improved, and a load transmission efficiency with which a load is transmitted to the outer wall portion 34B of the upper rear cross 34 may be raised.

In the present exemplary embodiment, the angled portion 59 that is angled to the lower side toward the vehicle width direction outer side of the rear cross-member 16 is provided between the fastening portion 57 and protruding portion 60 of the stabilizer reinforcement 40. Because this angled portion 59 is provided, even if dimensional inconsistency between the joining piece 62 of the protruding portion 60 and the outer wall portion 34B of the upper rear cross 34 is caused by inconsistencies in dimensional precision of the stabilizer reinforcement 40, this inconsistency may be absorbed. Consequently, inconsistency in a coupling strength of the stabilizer reinforcement 40 to the upper rear cross 34 may be reduced. As a result, inconsistency in deformation of the upper rear cross 34 may be reduced.

—Variant Examples of the Present Exemplary Embodiment—

In the present exemplary embodiment, as shown in FIG. 2, an example is described in which the cross-sectional shapes of the upper rear cross 34 and the lower rear cross 36 are, respectively, a substantial inverted "U" shape and a substantial "U" shape. However, provided the closed cross section portion 38 is formed between the upper rear cross 34 and the lower rear cross 36 (see FIG. 4), this shape is not limiting.

In the present exemplary embodiment, as shown in FIG. 3 and FIG. 4, the stabilizer reinforcement 40 is formed in a substantial crank shape in side view (seen from the vehicle sideward side), including the fastening portion 57, the upright wall portion 58, the protruding portion 60 and the joining piece 64. However, the stabilizer reinforcement 40 is not limited to this shape. Moreover, the protruding portion 60 and the joining piece 64 are not necessarily required.

In the present exemplary embodiment, the stabilizer bracket 44, the upper rear cross 34, the stabilizer reinforcement 40 and the lower rear cross 36 are fastened to one another. However, it is sufficient for the stabilizer reinforcement 40 to be fastened together with the stabilizer bracket 44 and the upper rear cross 34; fastening to the lower rear cross 36 is not necessarily required.

In the present exemplary embodiment, the protruding portion 60 is specified such that the angle θ with respect to the fastening portion 57 is approximately 10°. However, it is sufficient for this angle to be at least 0° and at most 90°; there is no impediment to the angle θ being 0° or 90°. If the angle θ is 0°, no ridge line is formed between the fastening portion 57 and the protruding portion 60. Therefore, in consideration of strength and stiffness of the stabilizer reinforcement 40, it is preferable that the angle is larger than 0°.

If the angle θ is 90°, the joining piece 62 provided at the distal end portion of the protruding portion 60 is joined at the side at which the lower rear cross 36 is disposed. That is, the joining piece 62 provided at the distal end portion of the protruding portion 60 is joined to the outer wall portion 34B of the upper rear cross 34 (at the joining portion 37) in the present exemplary embodiment, but the joining piece 62 may be joined at the side at which the outer wall portion 36B or lower wall portion 36A of the lower rear cross 36 is disposed. Thus, if the angle θ is 90°, a further upright wall portion that is substantially parallel to the upright wall portion 58 is formed, and stiffness of the fastening portion 57 is further improved.

In the present exemplary embodiment, the upper rear cross 34 is joined to the periphery wall portion 20A of the body mount 20 along the peripheral direction (the lateral joining portion 74) and the axial direction (the upright joining portion 72). However, joining portions are not necessarily required to be along the peripheral direction or the axial direction of the periphery wall portion 20A of the body mount 20.

In the present exemplary embodiment, an example is described in which the stabilizer support structure 10 is employed at the suspension member 12 side. However, it will be obvious that the stabilizer support structure 10 may be employed at a rear suspension member side (not shown in the drawings).

Hereabove, an exemplary embodiment of the present disclosure has been described, but the present disclosure is not limited by this exemplary embodiment. The exemplary embodiment and various variant examples may be used in suitable combinations, and it will be obvious that numerous modes may be embodied within a technical scope not departing from the concept of the present disclosure.

What is claimed is:

1. A stabilizer support structure, comprising:

a suspension member having a first side rail portion that is disposed along a vehicle front-rear direction and a first cross-member portion that is disposed along a vehicle width direction, the first side rail portion and the first cross-member portion being formed integrally, the suspension member including:

an upper suspension member forming an upper portion with respect to a vehicle vertical direction of the suspension member, the upper suspension member including a first fastening portion to which a bracket is fastened at an intersection portion between the first side rail portion and the first cross-member portion, the bracket supporting a rod-shaped stabilizer having a length direction in the vehicle width direction, and a lower suspension member forming a lower portion with respect to the vehicle vertical direction of the suspension member, the lower suspension member forming a closed cross section portion with the upper suspension member; and a reinforcing member joined to both the upper suspension member and the lower suspension member inside the closed cross section portion at the intersection portion, the reinforcing member spanning from the upper suspension member to the lower suspension member in the vehicle vertical direction, the reinforcing member being fastened together with the bracket via the first fastening portion, wherein the first side rail portion is configured to extend towards a second cross-member portion disposed across from the first cross-member portion in the vehicle front-rear direction and a partial distance to the second cross-member portion, the first side rail portion being configured to receive a second side rail portion extending from the second cross-member portion and towards the first cross-member portion such that the first side rail portion and the second side rail portion overlap.

2. The stabilizer support structure according to claim 1, wherein:

the upper suspension member includes first fastening holes formed in the first fastening portion so as to form a pair in the vehicle front-rear direction, and the reinforcing member includes:

a second fastening portion fastened with the first fastening portion and the bracket;

second fastening holes formed in the second fastening portion so as to form a pair in the vehicle front-rear direction in correspondence with the first fastening holes; and an upright wall portion formed at a vehicle width direction inner side of the suspension member relative to the second fastening portion, the upright wall portion being formed along the vehicle vertical direction and the vehicle front-rear direction inside the closed cross section portion at the intersection portion.

3. The stabilizer support structure according to claim 2, wherein the reinforcing member further includes:

a protruding portion protruding from the second fastening portion toward an outer side in the vehicle width direction of the suspension member, and a distal end portion of the protruding portion, the distal end portion being joined to one of an outer wall portion extending down from an outer edge portion of an upper wall portion of the upper suspension member or from an outer wall portion rising up from an outer edge portion of a lower wall portion of the lower suspension member.

4. The stabilizer support structure according to claim 1, wherein:

the upper suspension member is joined to a body mount configured to mount the suspension member to a vehicle framework side, and a joining portion between the upper suspension member and the body mount includes a lateral joining portion joined along a horizontal direction and an upright joining portion joined along the vehicle vertical direction.

5. The stabilizer support structure according to claim 1, wherein the lower suspension member includes a lower side rail portion disposed along the vehicle front-rear direction and integrally formed with a lower fastening portion and a lower cross-member portion disposed along the vehicle width direction.

* * * * *